3,147,074
SULFURIC ACID PROCESS

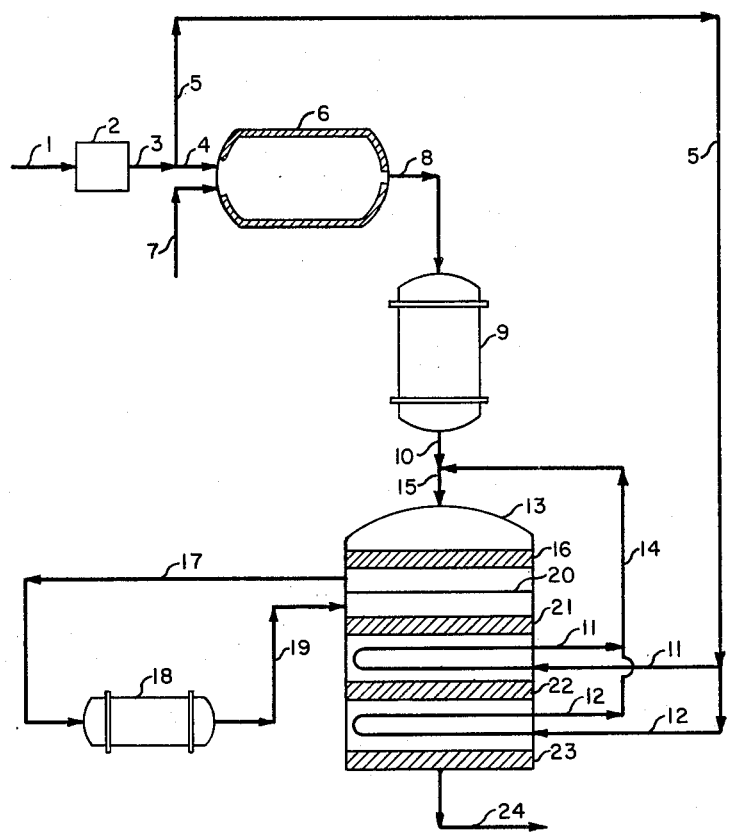

Michael H. Maurer, New York, N.Y., assignor to Chemical Construction Corporation, New York, N.Y., a corporation of Delaware
Filed Sept. 18, 1961, Ser. No. 138,826
4 Claims. (Cl. 23—168)

This invention relates to the production of sulfuric acid. An improved process sequence involving pre-heating of process air has been devised, which permits the improved recovery of process heat and also reduces equipment size and cost.

The conventional procedure for the production of sulfuric acid involves the burning of sulfur with pre-dried air. The resulting gas stream containing sulfur dioxide, nitrogen and excess oxygen is then cooled in a waste heat boiler, optionally filtered for dust removal, and passed through a multi-stage catalytic converter provided with intercoolers. The gas stream, now containing principally sulfur trioxide, nitrogen and residual oxygen is then cooled and scrubbed with 98% acid in an absorption tower. In this process, the major proportion of air required for oxidation of sulfur to sulfur trioxide is usually admitted into the process in the sulfur combustion stage or immediately thereafter. As a result, the sulfur furnace and waste heat boiler must be sized to accommodate this volume of process air. In addition, the temperature of the gas stream leaving the furnace is considerably lower than that obtainable by stoichiometric combustion of the sulfur with air, since the excess air required for subsequent oxidation of sulfur dioxide to sulfur trioxide is present and serves to cool and dilute the gas stream.

In the present invention, the total volume of pre-dried process air is admitted into the process in two separate streams. A first stream of air is utilized to burn the sulfur in the sulfur furnace. The proportion of air in this case is only moderately in excess of the stoichiometric requirement. The resulting process stream containing sulfur dioxide is thus of smaller volume than in the prior art, and in addition this stream is obtained at a higher temperature level. Heat is recovered from this stream in a waste heat boiler. Due to the smaller volume and higher temperature, the boiler is of considerably reduced size and requires less heat transfer surface for an amount of steam generation comparable to that of the prior art.

A second stream of air is preheated by heat exchange with the main process stream in the catalytic converter. This heated air stream is then combined with the main process stream leaving the waste heat boiler. The combined stream is then passed through the catalytic converter for conversion of sulfur dioxide to sulfur trioxide. Subsequently, the sulfur trioxide is cooled and absorbed in strong sulfuric acid in a conventional manner to yield product acid.

This process sequence results in considerable improvement over prior art procedures. Thus, as described supra, the volume of the sulfur furnace and waste heat boiler is considerably reduced since the second stream of process air bypasses these units and is only added to the main stream after the waste heat boiler. In addition, since the process gas stream leaving the sulfur furnace is at a relatively higher temperature level, improved heat transfer is obtained and the amount of heat transfer surface required in the boiler is reduced.

Another advantage of the present invention involves heat recovery considerations. Since the second air stream is preheated before addition to the main process stream, the main process stream may be cooled to a somewhat lower temperature level in the waste heat boiler. Thus, an additional amount of heat is recovered as high pressure steam by utilizing the heat of reaction of sulfur dioxide to sulfur trioxide between the converter catalytic beds.

Additional advantages may be mentioned. Since the initial volume of process air for the combustion of the sulfur to sulfur dioxide is decreased, the cost of the large piping and insulation associated with the sulfur furnace and waste heat boiler is considerably reduced. In addition, since the process gas stream is at a higher temperature level, it has been found that the gas filter usually included in the system can more effectively remove dust and ash, apparently because this solid material is somewhat more easily caught by filter surfaces at higher temperatures.

It is an object of the present invention to produce sulfuric acid in an improved manner.

Another object is to reduce capital and operating costs in a sulfuric acid process.

An additional object is to produce sulfuric acid with improved heat recovery.

A further object is to utilize process air in an improved manner in a sulfuric acid process.

These and other objects and advantages of the present invention will become evident from the description which follows. Referring to the figure, which represents a preferred embodiment of the present invention, ambient air stream 1 is passed into drying unit 2. Unit 2 may be any conventional means for drying air, however, typically in sulfuric acid practice unit 2 is a tower in which the air stream is scrubbed with strong sulfuric acid, which readily absorbs the moisture content from the air. As is well known to those skilled in the art, process air must be pre-dried in order to prevent the subsequent formation of sulfuric acid mist during and after catalytic formation of sulfur trioxide. The dried air stream now leaves unit 2 via 3.

The total air stream 3 is now divided into a first process air stream 4 and a second process air stream 5. Stream 4 is utilized to burn sulfur in furnace 6, while stream 5 is added to the main process at a later point as will appear infra. In general, stream 4 will amount to about 60% to 70% of stream 3. Sulfur stream 7 is also passed into furnace 6, usually in the form of a spray of molten liquid. The resulting process gas stream 8 will, in any event, consist of sulfur dioxide together with excess oxygen and nitrogen. Typically, when burning sulfur, stream 8 will contain about 12% to 14% sulfur dioxide and will be at a temperature in the range of 2100° F. to 2300° F. Stream 8 is passed into waste heat boiler 9, where the gas stream is cooled and sensible heat recovered in the form of high pressure steam. The process gas stream now leaves unit 9 via 10 at a temperature preferably in the range of 900° F. to 1000° F., and may be filtered at this point by means not shown to remove entrained solids derived from process feed streams 4 and 7.

Returning now to process air flow, stream 5, derived from stream 3, will usually amount to about 30% to 40% of the total volume of stream 3. Stream 5 is now divided into sub-streams 11 and 12. These streams are heated by heat exchange with the main process stream in converter 13, to a temperature usually in the range of 300° F. to 400° F., and are then re-combined to form heated air stream 14. A portion of stream 5 will be usually by-passed directly to stream 14 to provide temperature control. Stream 14 is now combined with stream 10 to form a total process stream 15 containing about 8% to 9.5% sulfur dioxide, at a temperature typically between about 800° F. to 850° F.

Stream 15 passes into converter 13, and a large proportion of the sulfur dioxide content of stream 15 is oxidized to sulfur trioxide in first catalyst bed 16. This is an exothermic reaction, and the resulting partially converted process gas stream is withdrawn from converter 13 via 17 at a temperature in the range of 1050° F. to 1120° F. The hot gas stream 17 is cooled in waste heat boiler 18 to a temperature in the range of 800° F. to 850° F. prior to further conversion, and is returned via 19 into converter 13 below baffle 20.

The process gas stream now passes down through beds 21, 22 and 23, wherein final catalytic conversion of sulfur dioxide to sulfur trioxide takes place. Interbed cooling is maintained by heat exchange with air streams 11 and 12. The final, fully converted gas stream leaves converter 13 via 24 at a temperature of about 820° F. to 850° F., and is passed to conventional means, not shown, for recovery of heat and then sulfur trioxide content as sulfuric acid.

Various alternatives with the scope of the present invention will occur to those skilled in the art.

In some cases sulfur dioxide at low strength may be the sulfur source for the contact process. In this event, the heat of reaction in the second and third beds of catalyst can be recovered by passing part of the dried sulfur dioxide gas through the cooling coils of these beds and thereby preheating the sulfur dioxide gas without supplying additional outside heat. The minimum operating capacity of the plant can also be reduced to a lower level by utilizing this method of heat recovery.

*Example*

An example of a proposed industrial application of the process of the present invention will now be described. In this case, the process was to be employed in a facility producing 93% sulfuric acid from sulfur in a sulfur burning contact acid plant.

Ambient air is pre-dried by scrubbing with 93% acid in a packed tower. About 65% of the dried air is delivered to the sulfur furnace where the sulfur is burned to produce 14% sulfur dioxide gas at a temperature of about 2300° F. The furnace exit gas is cooled to about 1000° F. in a firetube waste heat boiler and then passes through a gas filter charged with pumice, for removal of ash.

The other 35% of the dried air flows through hairpin type cooling coils in the converter shell after the second and third stages of conversion where it is heated to 400° F. This preheated air is mixed with the main process gas stream leaving the gas filter to provide a gas containing about 8.5% sulfur dioxide at 820° F. entering the converter. The converter is a single unit with 4 stages. The heat of reaction generated in the first stage of conversion is removed from the gas in a waste heat boiler, which operates with a common steam drum with the boiler after the sulfur furnace. The partially converted gas, cooled to 820° F., is returned to the converter and passes through the next three stages of conversion. The heat of reaction in the second and third stages is removed from the gas by internal heat exchange with process air, as previously mentioned, so that the gas enters each subsequent stage at the temperature for optimum conversion.

The gas leaving the converter passes next through the economizer where it is cooled to 450° F. The gas finally goes to the 98% absorption tower where the sulfur trioxide content is absorbed in acid recirculated over the tower. Water is added to the system to maintain the acid strength constant at 98% to 99.0% sulfuric acid. A portion of this acid may be continuously drawn off and delivered to the 93% acid system for dilution to product strength.

The main waste heat boiler generates byproduct steam at 225 p.s.i.g. or at higher pressure if desired. The volume of process gas cooled in the main boiler was 65% of that handled in previous installations. In addition, process gas inlet temperature to the boiler was more than 150° F. higher than in previous cases. These process improvements were due to the addition of the second stream of process air after the waste heat boiler. As a result of these modifications, the total boiler heat exchange surface was reduced to 75% of that previously required for the same overall plant capacity. In addition, the combustion furnace and process high temperature insulated ductwork was also reduced in size by about 10%. Substantial capital cost savings were thus realized.

What I claim is:

1. Process for production of sulfuric acid which comprises burning sulfur to sulfur dioxide with a first stream of pre-dried air, cooling the resulting gas stream containing sulfur dioxide in steam generation means, heating a second stream of pre-dried air by heat exchange in catalytic conversion means for the oxidation of sulfur dioxide to sulfur trioxide, combining said heated second air stream with said sulfur dioxide-containing gas stream, passing the combined gas stream through said catalytic conversion means, recovering a final gas stream from said conversion means comprising sulfur trioxide, and absorbing said sulfur trioxide in concentrated sulfuric acid to form further sulfuric acid in the liquid phase.

2. Process for producting of sulfuric acid which comprises burning sulfur to sulfur dioxide with a first stream of pre-dried air, cooling the resulting gas stream containing sulfur dioxide in steam generation means, heating a second stream of pre-dried air by heat exchange in multi-stage catalytic conversion means for the oxidation of sulfur dioxide to sulfur trioxide, combining said heated second air stream with said sulfur dioxide-containing gas stream, passing the combined gas stream through the first stage of said catalytic conversion means, cooling the partially converted gas stream in steam generation means, further converting said gas stream in at least one other stage of said catalytic conversion means, cooling said gas stream by said heat exchange, recovering a final gas stream from said conversion means comprising sulfur trioxide, and absorbing said sulfur trioxide in concentrated sulfuric acid to form further sulfuric acid in the liquid phase.

3. Process for production of sulfur dioxide which comprises burning sulfur to sulfur dioxide with a first stream of pre-dried air, cooling the resulting gas stream containing about 12% to 14% sulfur dioxide from a temperature in the range of 2100° F. to 2300° F. to a temperature of about 900° F. to 1000° F. in steam generation means, heating a second stream of pre-dried air by heat exchange in multi-stage catalytic conversion means for the oxidation of sulfur dioxide to sulfur trioxide to a temperature in the range of 300° F. to 400° F., combining said heated second air stream with said sulfur dioxide-containing gas stream to form a combined gas stream containing 8% to 9% sulfur dioxide at 800° F. to 850° F., passing said combined gas stream through the first stage of said catalytic conversion means whereby partial conversion of sulfur dioxide to sulfur trioxide takes place and the temperature of said gas stream rises to between 1050° F. to 1120° F., cooling the partially converted gas stream to between 800° F. to 850 F. in steam generation means, further converting said gas stream in at least one other stage of said catalytic conversion means, cooling said gas stream by said heat exchange, recovering a final gas stream from said conversion means comprising sulfur trioxide, and absorbing said sulfur trioxide in concentrated sulfuric acid to form further sulfuric acid in the liquid phase.

4. Process of claim 3, in which the relative rates of said first and said second streams are in a proportion of about 2 to 1.

References Cited in the file of this patent

UNITED STATES PATENTS

| | | |
|---|---|---|
| 1,405,669 | Chase et al. | Feb. 7, 1922 |
| 1,995,360 | Merriam | Mar. 26, 1935 |
| 2,112,689 | Carl | Mar. 29, 1938 |
| 2,312,223 | Titlestad et al. | Feb. 23, 1943 |
| 2,337,060 | Munsen | Dec. 21, 1943 |